(12) United States Patent
Nishimoto et al.

(10) Patent No.: US 7,261,515 B2
(45) Date of Patent: Aug. 28, 2007

(54) SHAFT SEALING MECHANISM, STRUCTURE FOR MOUNTING SHAFT SEALING MECHANISM ON STATOR, AND TURBINE

(75) Inventors: Shin Nishimoto, Hyogo-ken (JP); Tanehiro Shinohara, Hyogo-ken (JP); Hidekazu Uehara, Hyogo-ken (JP); Takashi Nakano, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 66 days.

(21) Appl. No.: 11/200,128

(22) Filed: Aug. 10, 2005

(65) Prior Publication Data

US 2006/0033285 A1 Feb. 16, 2006

(30) Foreign Application Priority Data

Aug. 10, 2004 (JP) .............................. 2004-233338

(51) Int. Cl.
*F01D 11/00* (2006.01)
(52) U.S. Cl. ..................................... 415/174.2; 277/355
(58) Field of Classification Search ............. 415/174.2, 415/174.5, 170.1, 229, 230, 231; 277/355, 277/411, 412
See application file for complete search history.

(56) References Cited

U.S. PATENT DOCUMENTS 6,267,381 B1 7/2001 Wright
6,736,597 B2 5/2004 Uehara et al.
6,840,518 B2* 1/2005 Boston .................. 277/355
2002/0105146 A1 8/2002 Uehara et al.
2004/0256810 A1 12/2004 Nakano et al.
2005/0012275 A1 1/2005 Nakano et al.

FOREIGN PATENT DOCUMENTS

| EP | 0 933 567 A2 | 8/1999 |
|---|---|---|
| EP | 1 231 416 A2 | 8/2002 |
| EP | 1 479 951 A2 | 11/2004 |
| EP | 1 479 952 A2 | 11/2004 |
| FR | 2 650 048 | 1/1991 |
| JP | 2002-13647 | 1/2002 |
| JP | 2003-4149 | 1/2003 |
| JP | 2003-113945 | 4/2003 |

\* cited by examiner

*Primary Examiner*—Edward K. Look
*Assistant Examiner*—Dwayne J White
(74) *Attorney, Agent, or Firm*—Wenderoth, Lind & Ponack, L.L.P.

(57) ABSTRACT

A shaft sealing mechanism of an annular shape having at least one divided portion, which is installed in an annular space between a rotor and a stator, includes a group of thin plates. Outer peripheral ends of the thin plates are joined, and inner peripheral free ends come in contact with the rotor in a sliding manner so that a surface of the rotor and the thin plates form an acute angle to partition the annular space into a high-pressure region and a low-pressure region without being joined. At least a low-pressure gap near the divided portion is set to be larger than a low-pressure gap in a circumferential direction other than near the divided portion.

9 Claims, 9 Drawing Sheets

(HIGH-PRESSURE REGION)　　(LOW-PRESSURE REGION)

WORKING FLUID

ROTOR AXIAL LINE DIRECTION

SHAFT SEALING MECHANISM, STRUCTURE FOR MOUNTING SHAFT SEALING MECHANISM ON STATOR, AND TURBINE

BACKGROUND OF THE INVENTION

1. Field of the Invention

The present invention relates to a shaft sealing mechanism, a structure for mounting the shaft sealing mechanism on a stator, and a turbine including the shaft sealing mechanism and the structure for mounting the shaft sealing mechanism on a stator.

2. Description of the Related Art

In general, a turbine is provided around a rotor thereof with static blades and dynamic blades, and has a shaft sealing mechanism around the rotor in order to reduce a leakage amount of working fluid flowing from a high pressure side to a low pressure side. As one example of such a shaft sealing mechanism, there are leaf seals disclosed in Japanese Patent Application Laid-Open Nos. 2002-013647, 2003-113945, and the like.

Figure 8:
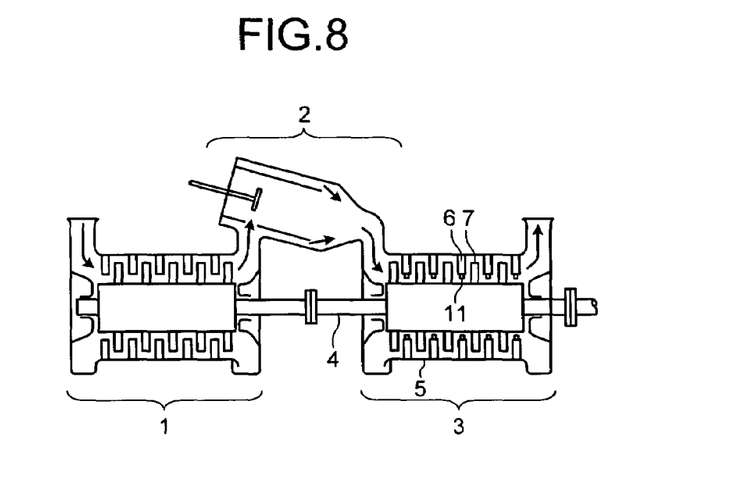
FIG. 8 is a perspective view of a gas turbine.

The turbine includes a gas turbine and a steam turbine, and an entire structure of the gas turbine is shown, as one example, in FIG. 8. Air compressed by a compressor 1 is mixed with fuel to be combusted in a combustor 2. Combustion gas, as working fluid, generated in the combustor 2 expands so that thermal energy of the combustion gas is converted to rotational energy in the courses of passing through static blades 6 and dynamic blades 7, which are provided alternatively around a rotor 4. The thus converted rotational energy is taken out as electric power. A shaft sealing mechanism 11 is provided between each static blade 6 and the rotor 4 in order to reduce a leakage amount of the combustion gas from a high pressure side to a low pressure side, and a leaf seal is used as an example of the shaft sealing mechanism.

Figure 9:
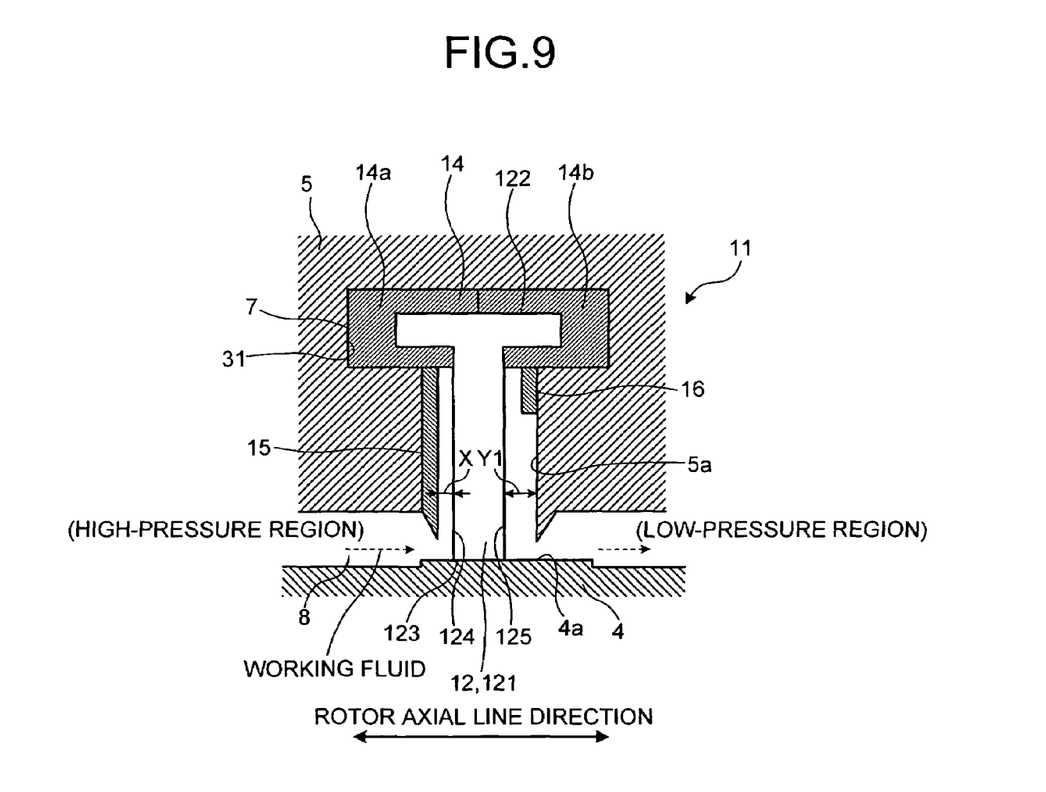
FIG. 9 is a cross section of the conventional leaf seal.

One example of a conventional shaft sealing mechanism including the leaf seals is shown in FIG. 9. The shaft sealing mechanism 11 has a structure in which many thin plates 121, having a fixed width in an axial line direction of the rotor 4, are arranged in a multi-layered manner. The shaft sealing mechanism 11 includes a thin plate group 12 where the thin plates are arranged annularly in a circumferential direction of the rotor 4 and are disposed with fine spacing along the circumferential direction thereof. The thin plate group 12 is joined at an outer peripheral proximal end 122 thereof, and an inner peripheral free end 123 thereof comes in sliding contact with a rotor outer peripheral face 4a to form an acute angle to the rotor 4 without being joined. Thus, an annular space 8, which is provided between the rotor 4 and a stator 5 to allow working fluid to flow, is partitioned into a high-pressure region and a low-pressure region.

The thin plate group 12 is fixed to a leaf seal ring 14 obtained by combining a pair of divided seal rings 14a and 14b, and each thin plate 121 has a T-shape cross section, including a rotor axial line. The leaf seal ring 14 also includes a high-pressure-side plate 15 provided on a side adjacent to the high-pressure region through the thin plate group 12, and a low-pressure-side plate 16 provided on a side adjacent to the low-pressure region as guide plates for working fluid. A length of the low-pressure-side plate 16 is shorter than that of the high-pressure-side plate 15 in a sectional view including the rotor axial line, in order to generate a floating force by a gas pressure distribution acting on upper and lower faces of the thin plates 121. Therefore, a gap defined between a stator inner wall 5a adjacent to the low-pressure region and a thin plate edge 125 (hereinafter, "low-pressure gap Y1") is larger than a gap defined between the high-pressure-side plate 15 provided adjacent to the high-pressure region and a thin plate edge 124 (hereinafter, "high-pressure gap X") (X<Y1).

The shaft sealing mechanism 11 with the above configuration is fittingly inserted into a recessed groove 31 provided on the stator 5. The inner peripheral free end 123 of each thin plate 121 is floated from the outer peripheral face 4a of the rotor 4 by a floating force due to working fluid acting on the thin plate 121 and a dynamic pressure effect of working fluid due to rotation of the rotor 4 to achieve a non-contacting state between the inner peripheral free end 123 and the outer peripheral face 4a. Thus, each thin plate is prevented from wearing and generating heat.

Figure 10:
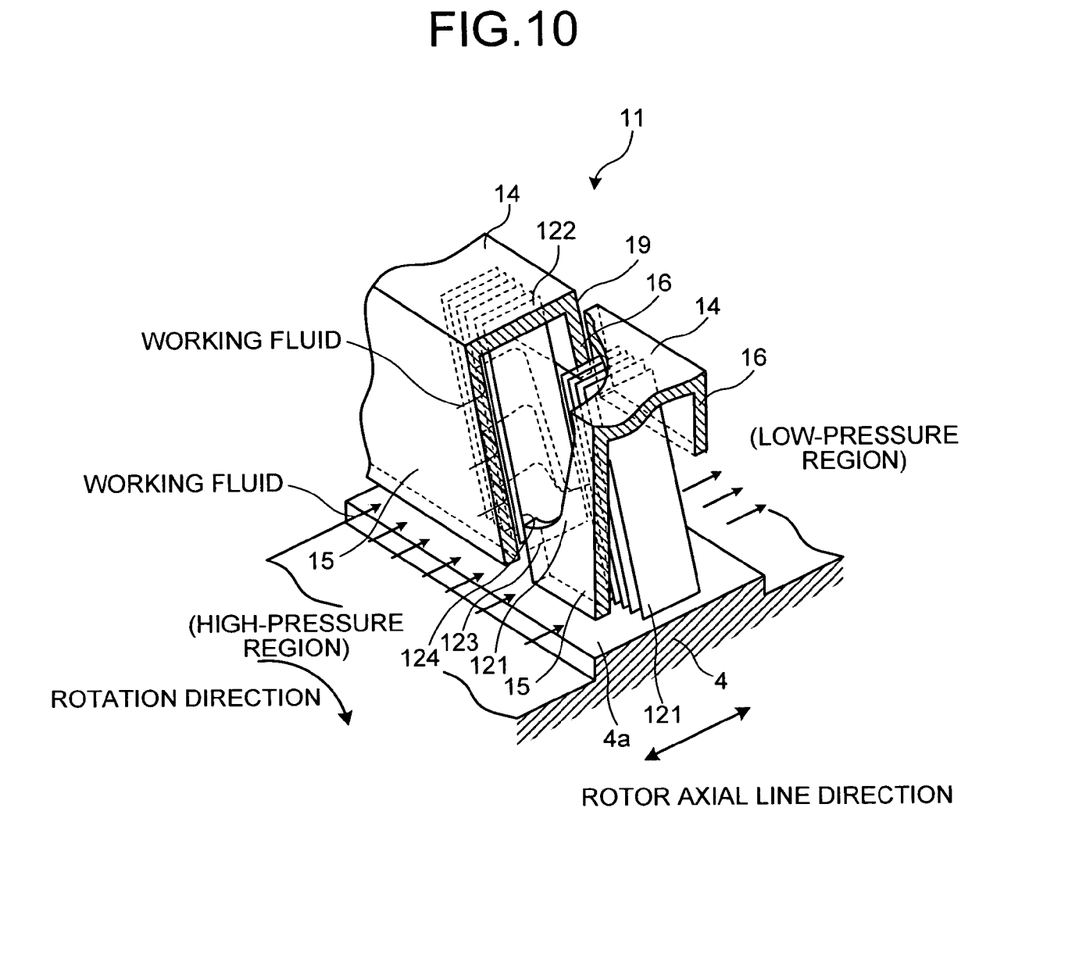
FIG. 10 is a perspective view around the divided portion of a divided-type leaf seal.

Conventionally, the shaft sealing mechanism with such a leaf seal has a divided portion in a radial direction to the rotor axial center in order to facilitate assembling. A plurality of pieces of the divided leaf seal are sequentially assembled to the stator to integrally exhibit a sealing function. However, even if the assembled and integrated annular seal is formed, since it has at least one (usually, plural) divided portion in a radial direction to the rotor axial center, high pressure working fluid eventually flows into the leaf seal via a gap formed by the divided portions. FIG. 10 schematically depicts a flow of working fluid around the divided portion of the leaf seal. An actual leaf seal has a head of the thin plate 121 formed in a wide T-shape in cross section, including the rotor axial center, but it is schematically simplified as a rectangular shape in FIG. 10. Working fluid that has flowed in the shaft sealing mechanism 11 from a divided portion 19 flows into the inside from a gap (a high-pressure gap) between the high-pressure-side plate 15 and the thin plate edge 124 of the thin plate 121 along the high-pressure-side plate 16 in a circumferential direction, to flow down on a surface of the thin plate 121 along upper and lower faces of the thin plate 121. As disclosed in Japanese Patent Application Laid-Open No. 2002-013647, the working fluid passes through a gap between the lower end of the high-pressure-side plate 15 and the rotor outer peripheral face 4a at any point in the circumferential direction on the leaf seal, except for around the divided portion of the leaf seal, to flow on the upper and the lower faces of the thin plate 121 from the side of the inner peripheral free end 123 of the thin plate 121 toward the side of the outer peripheral proximal end 122.

Around the divided portion, however, the working fluid flows from the divided portion 19 into the shaft sealing mechanism 11 while maintaining the same pressure over the entire length of the high-pressure-side plate 15 in a sectional view including the rotor axial line. Therefore, the same pressure acts on the side of the outer peripheral proximal end 122 and the side of the inner peripheral free end 123 around the thin plate edge 124 of the thin plate 121. This technique is different from the conventional example in this point. However, a pressing force acts on the thin plate due to fluctuation over a gas pressure distribution, and the inner peripheral free end 123 comes in contact with the rotor outer-surface 4a so that wearing and heat generation of the thin plate occurs.

SUMMARY OF THE INVENTION

It is an object of the present invention to at least solve the problems in the conventional technology.

A shaft sealing mechanism of an annular shape having at least one divided portion according to one aspect of the present invention, which is installed in an annular space between a rotor and a stator, includes a group of thin plates obtained by stacking a plurality of thin plates. Outer peripheral ends of the thin plates are joined. Inner peripheral free ends of the thin plates come in contact with the rotor in a sliding manner so that a surface of the rotor and the thin plates form an acute angle to partition the annular space into a high-pressure region and a low-pressure region without being joined. At least a low-pressure gap near the divided portion is set to be larger than a low-pressure gap in a circumferential direction other than near the divided portion.

A shaft sealing mechanism of an annular shape having at least one divided portion according to another aspect of the present invention, which is installed in an annular space between a rotor and a stator, includes a group of thin plates obtained by stacking a plurality of thin plates. Outer peripheral ends of the thin plates are joined. Inner peripheral free ends of the thin plates come in contact with the rotor in a sliding manner so that a surface of the rotor and the thin plates form an acute angle to partition the annular space into a high-pressure region and a low-pressure region without being joined. At least a low-pressure gap near the divided portion is set to be larger than a gap between an inner wall of the stator or a mounting piece inner wall and edges of the thin plates.

A shaft sealing mechanism of an annular shape having at least one divided portion according to still another aspect of the present invention, which is installed in an annular space between a rotor and a stator, includes a group of thin plates obtained by stacking a plurality of thin plates. Outer peripheral ends of the thin plates are joined. Inner peripheral free ends of the thin plates come in contact with the rotor in a sliding manner so that a surface of the rotor and the thin plates form an acute angle to partition the annular space into a high-pressure region and a low-pressure region without being joined. At least a low-pressure gap is set near the divided portion in such a manner that a pressing force acting on the thin plates is not generated by working fluid flowing downward on surfaces of the thin plates.

A structure according to still another aspect of the present invention is for mounting a shaft sealing mechanism of an annular shape on a stator. The shaft sealing mechanism is installed in an annular space between a rotor and the stator. The shaft sealing mechanism includes a group of thin plates obtained by stacking a plurality of thin plates. Outer peripheral ends of the thin plates are joined. Inner peripheral free ends of the thin plates come in contact with the rotor in a sliding manner so that a surface of the rotor and the thin plates form an acute angle to partition the annular space into a high-pressure region and a low-pressure region without being joined. A recessed groove that can accommodate the shaft sealing mechanism is formed on the stator. A mounting piece is fittingly inserted into a gap generated after the shaft sealing mechanism is assembled to the recessed groove. An annular recess is provided on a surface of the mounting piece opposite to a low-pressure-side plate.

A shaft sealing mechanism of an annular shape according to still another aspect of the present invention, which is installed between a rotor and a stator, includes a group of thin plates obtained by stacking a plurality of thin plates. Outer peripheral ends of the thin plates are joined. Inner peripheral free ends of the thin plates come in contact with the rotor in a sliding manner so that a surface of the rotor and the thin plates form an acute angle to partition the annular space into a high-pressure region and a low-pressure region without being joined. The shaft sealing mechanism is formed integrally without including a divided portion so that a pressing force acting on the thin plates is not generated by working fluid.

A structure according to still another aspect of the present invention is for mounting a shaft sealing mechanism of an annular shape on a stator. The shaft sealing mechanism is installed in an annular space between a rotor and the stator. The shaft sealing mechanism is formed integrally without including a divided portion. The shaft sealing mechanism includes a group of thin plates obtained by stacking a plurality of thin plates. Outer peripheral ends of the thin plates are joined. Inner peripheral free ends of the thin plates come in contact with the rotor in a sliding manner so that a surface of the rotor and the thin plates form an acute angle to partition the annular space into a high-pressure region and a low-pressure region without being joined. A recessed groove that can accommodate the shaft sealing mechanism is formed on the stator. A mounting piece is fittingly inserted into a gap generated after the shaft sealing mechanism is assembled to the recessed groove.

A turbine according to still another aspect of the present invention includes a shaft sealing mechanism of an annular shape having at least one divided portion. The shaft sealing mechanism is installed in an annular space between a rotor and a stator. The shaft sealing mechanism includes a group of thin plates obtained by stacking a plurality of thin plates. Outer peripheral ends of the thin plates are joined. Inner peripheral free ends of the thin plates come in contact with the rotor in a sliding manner so that a surface of the rotor and the thin plates form an acute angle to partition the annular space into a high-pressure region and a low-pressure region without being joined. At least a low-pressure gap near the divided portion is set to be larger than a low-pressure gap in a circumferential direction other than near the divided portion.

A turbine according to still another aspect of the present invention includes a shaft sealing mechanism of an annular shape having at least one divided portion. The shaft sealing mechanism is installed in an annular space between a rotor and a stator. The shaft sealing mechanism includes a group of thin plates obtained by stacking a plurality of thin plates. Outer peripheral ends of the thin plates are joined. Inner peripheral free ends of the thin plates come in contact with the rotor in a sliding manner so that a surface of the rotor and the thin plates form an acute angle to partition the annular space into a high-pressure region and a low-pressure region without being joined. At least a low-pressure gap near the divided portion is set to be larger than a gap between an inner wall of the stator or a mounting piece inner wall and edges of the thin plates.

A turbine according to still another aspect of the present invention includes a shaft sealing mechanism of an annular shape having at least one divided portion. The shaft sealing mechanism is installed in an annular space between a rotor and a stator. The shaft sealing mechanism includes a group of thin plates obtained by stacking a plurality of thin plates. Outer peripheral ends of the thin plates are joined. Inner peripheral free ends of the thin plates come in contact with the rotor in a sliding manner so that a surface of the rotor and the thin plates form an acute angle to partition the annular space into a high-pressure region and a low-pressure region without being joined. At least a low-pressure gap is set near the divided portion in such a manner that a pressing force acting on the thin plates is not generated by working fluid flowing downward on surfaces of the thin plates.

A turbine according to still another aspect of the present invention includes a structure for mounting a shaft sealing mechanism of an annular shape on a stator. The shaft sealing mechanism is installed in an annular space between a rotor and the stator. The shaft sealing mechanism includes a group of thin plates obtained by stacking a plurality of thin plates. Outer peripheral ends of the thin plates are joined. Inner peripheral free ends of the thin plates come in contact with the rotor in a sliding manner so that a surface of the rotor and the thin plates form an acute angle to partition the annular space into a high-pressure region and a low-pressure region without being joined. A recessed groove that can accommodate the shaft sealing mechanism is formed on the stator. A mounting piece is fittingly inserted into a gap generated after the shaft sealing mechanism is assembled to the recessed groove. An annular recess is provided on a surface of the mounting piece opposite to a low-pressure-side plate.

A turbine according to still another aspect of the present invention includes a shaft sealing mechanism of an annular shape that is installed between a rotor and a stator. The shaft sealing mechanism includes a group of thin plates obtained by stacking a plurality of thin plates. Outer peripheral ends of the thin plates are joined. Inner peripheral free ends of the thin plates come in contact with the rotor in a sliding manner so that a surface of the rotor and the thin plates form an acute angle to partition the annular space into a high-pressure region and a low-pressure region without being joined. The shaft sealing mechanism is formed integrally without including a divided portion so that a pressing force acting on the thin plates is not generated by working fluid.

A turbine according to still another aspect of the present invention includes a structure for mounting a shaft sealing mechanism of an annular shape on a stator. The shaft sealing mechanism is installed in an annular space between a rotor and the stator. The shaft sealing mechanism is formed integrally without including a divided portion. The shaft sealing mechanism includes a group of thin plates obtained by stacking a plurality of thin plates. Outer peripheral ends of the thin plates are joined. Inner peripheral free ends of the thin plates come in contact with the rotor in a sliding manner so that a surface of the rotor and the thin plates form an acute angle to partition the annular space into a high-pressure region and a low-pressure region without being joined. A recessed groove that can accommodate the shaft sealing mechanism is formed on the stator. A mounting piece is fittingly inserted into a gap generated after the shaft sealing mechanism is assembled to the recessed groove.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings. These embodiments are only illustrative, and the present invention is not limited to the embodiments as far as functions and structures of the shaft sealing mechanism constituting the feature of the present invention are provided. A gas turbine is taken as an example of the embodiments, but the present invention is also applicable to steam turbines.

According to a first embodiment of the present invention, a shaft sealing mechanism (hereinafter, "divided-type leaf seal") including leaf seal having at least one divided portion 1, and a structure for mounting the shaft sealing mechanism on a stator will be explained with reference to FIG. 1.

Figure 1:
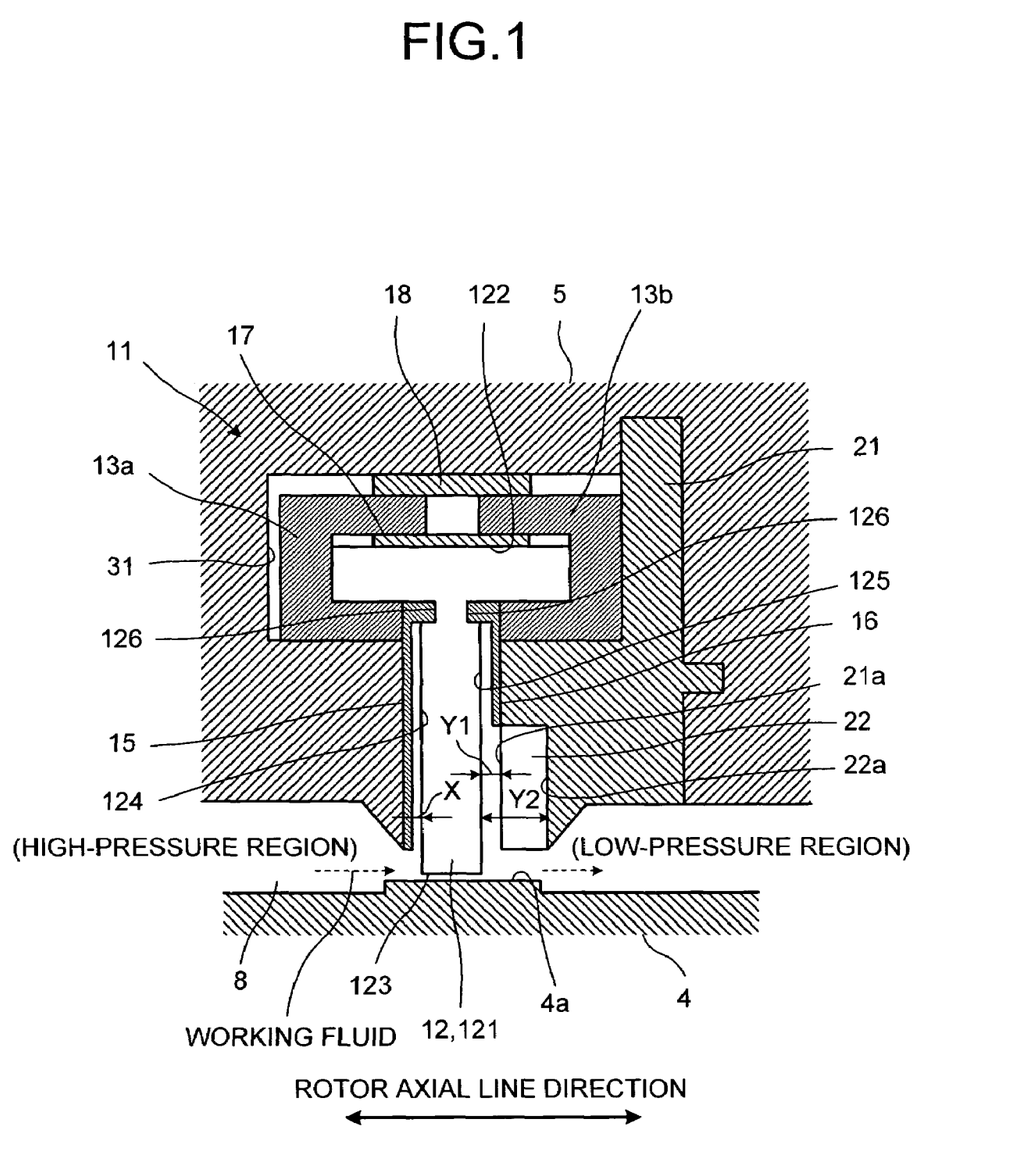
FIG. 1 is a cross section of a divided-type leaf seal according to the present invention and a structure for mounting the divided-type leaf seal on a stator.

FIG. 1 is a cross section of a shaft sealing mechanism including a leaf seal, and a mounting structure of the shaft sealing mechanism on a stator, including a rotor axial line. The shaft sealing mechanism including a leaf seal will be explained first. A shaft sealing mechanism 11 includes a thin plate group 12, a pair of thin-plate holding rings 13a, 13b, a high-pressure-side plate 15, a low-pressure-side plate 16, and a spacer 17. The shaft sealing mechanism 11 is provided in an annular space 8 between a rotor 4 and a stator 5 and is disposed around the rotor 4 to partition the annular space into a high-pressure region and a low-pressure region, thereby forming an annular seal at a face perpendicular to a rotor axial line. The shaft sealing mechanism 11 includes the thin plate group 12 having a T-shaped fixed width to a direction of the rotor axial line, where many thin plates 121 are stacked with fine spaces to one another in a circumferential direction of the rotor to form the annular seal. The thin plate 121 is fixed at an outer peripheral proximal end 122 by welding or the like, but it is not joined at its inner peripheral free end 123. The thin plate 121 comes in sliding contact with a rotor outer peripheral face 4a to form an acute angle to the rotor 4.

In order to prevent working fluid from blowing out, a high-pressure-side plate 15 and a low-pressure-side plate 16 serving as guide plates are disposed on an upstream side and a downstream side of working fluid flowing on respective thin plates 121. The high-pressure-side plate 15 is an annular plate and is arranged to be opposed to a thin plate edge 124 adjacent to the high-pressure region of the thin plate 121. The high-pressure-side plate 15 is fixed to the thin plate 121 by a receiving groove 126 provided on the thin plate 121 to keep a fixed gap (high-pressure gap X) between the high-pressure-side plate 15 and the thin plate edge 124. On the other hand, the low-pressure-side plate 16 is similarly an annular plate and is arranged to be opposed to the thin plate edge 125 adjacent to the low-pressure region of the thin plate 121. The low-pressure-side plate 16 is fixed to the thin plate 121 by the receiving groove 126 provided on the thin plate 121 to keep a fixed gap between the low-pressure-side plate 16 and the thin plate edge 125. A length of the low-pressure-side plate 16 is made shorter than that of the high-pressure-side plate 15 in a sectional view including the rotor axial line, so that a gap enlarged as compared with the gap between the low-pressure-side plate 16 and the thin plate edge 125 is provided. That is, such a gap is provided at any point except for around the divided portion of the shaft sealing mechanism, as a gap (low-pressure gap Y1) defined between a mounting piece inner wall 21a and the thin plate edge 125. As a result, more stable pressure distributions of working fluid can be obtained on upper and lower faces of the thin plate 121. A spacer 17 for constraining movement of the thin plate group 12 in a radial direction is arranged between the thin plate group 12 and the thin-plate holding rings 13a, 13b.

The stator 5 is formed, around the rotor axial center, with an annular recessed groove 31 that can receive the shaft sealing mechanism 11 easily in a sectional view including the rotor axial line. The recessed groove 31 is wider than a full width of the shaft sealing mechanism 11 in a direction of the rotor axial line, so that the shaft sealing mechanism 11 is fixed to the stator 5 by inserting the shaft sealing mechanism 11 into the recessed groove 31 and further fittingly inserting a mounting piece 21 into the remaining gap. A biasing member (for example, a leaf spring) 18 is provided between outer peripheral ends of the pair of thin-plate holding rings 13a, 13b and the stator 5 to press the thin-plate holding rings 13a, 13b in a direction of the axial center of the rotor 4. Thus, movement of the shaft sealing mechanism 11 in the radial direction is constrained. The mounting structure of the shaft sealing mechanism is realized by the shaft sealing mechanism 11, the recessed groove 31, the mounting piece 21, and the biasing member 18.

An annular recess 22 around the rotor axial center is formed on a face of the mounting piece 21 opposed to the low-pressure-side plate 16 around the divided portion of the shaft sealing mechanism. A gap (low-pressure gap Y2) is provided between the thin plate edge 125 and an annular recess inner wall 22a forming the annular recess 22.

A pressure distribution of working fluid is disturbed around the divided portion of the shaft sealing mechanism due to leakage of high pressure working fluid from the dividing portion, and the disturbance of the pressure distribution can not be absorbed by a gap with a size of about the low-pressure gap (Y1), so that downward pressing force acts on each thin plate 121. Therefore, the low-pressure gap (Y2) further larger than the low-pressure gap (Y1) is secured by providing the annular recess 22, so that the gas pressure distribution acting on the thin plate can be improved and the pressing force can be reduced (a concept of an improvement in pressure distribution is described later). The annular recess 22 can be provided to extend from a height equal to the lower end of the low-pressure-side plate 16 to a lower end of the mounting piece 21. FIG. 1 depicts the annular recess 22 provided by a fixed length from the divided face in a circumferential direction, but the annular recess 22 can be provided over an entire circumference of the mounting piece 21. When the annular recess is limited to a fixed length instead of the entire circumference, loss due to leakage of working fluid is reduced. The term "around the divided portion" is not limited to the divided face, but includes a range from the divided face to a point entering therefrom by about 100 millimeters in the circumferential direction.

A fundamental concept of a function and an operation of the present invention will be explained in comparison with the conventional shaft sealing mechanism including a leaf seal. An aspect of the conventional leaf seal is defined as Case 1. An aspect of the similar structure to Case 1 around the divided portion of a divided-type leaf seal is defined as Case 2. An aspect of the portion around the divided portion according to the first embodiment of the invention is defined as Case 3.

Figure 2A:
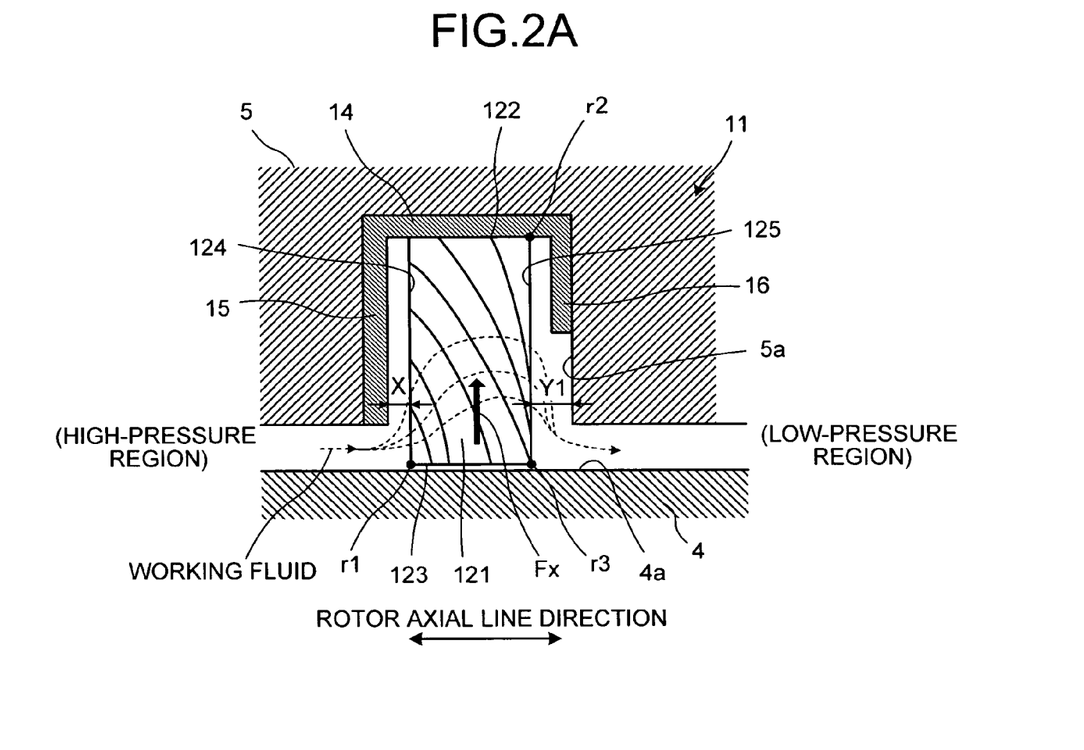
FIGS. 2A and 2B are schematics for illustrating a principle of an operation of a conventional leaf seal.

The concept of Case 1 will be explained with reference to FIGS. 2A and 2B, while taking a gas turbine as an example. As shown in FIG. 1, an actual leaf seal has substantially a T-shape cross section, including rotor axial line, but it is schematically shown to have a rectangular cross section in FIG. 2A. In FIG. 2A, a length of the low-pressure-side plate 16 is shorter than that of the high-pressure-side plate 15 in a sectional view including a rotor axial line. It is assumed herein that combustion gas pressure is applied to the thin plate 121 due to flowing of the combustion gas serving as working fluid from the high-pressure region to the low-pressure region. When the gap (the low-pressure gap Y1) between the low-pressure-side plate 16 and the stator inner wall 5a opposed thereto is set to be larger than the gap (the high-pressure gap X) between the high-pressure-side plate 15 and the thin plate edge 124 opposed thereto, a stable pressure distribution can be obtained. That is, a substantially triangular gas pressure distribution can be formed where the maximum gas pressure is obtained at a corner r1 positioned at the inner peripheral free end 123 on the thin plate edge 124, and gas pressure gradually lowers toward a diagonal corner r2 regarding upper and lower faces of the thin plate 121. That is, when a corner positioned on the inner peripheral free end 123 at the thin plate edge 125 is represented as r3, a relationship of r1>r3>r2 is satisfied in gas pressure comparison at the respective corners.

Figure 2B:
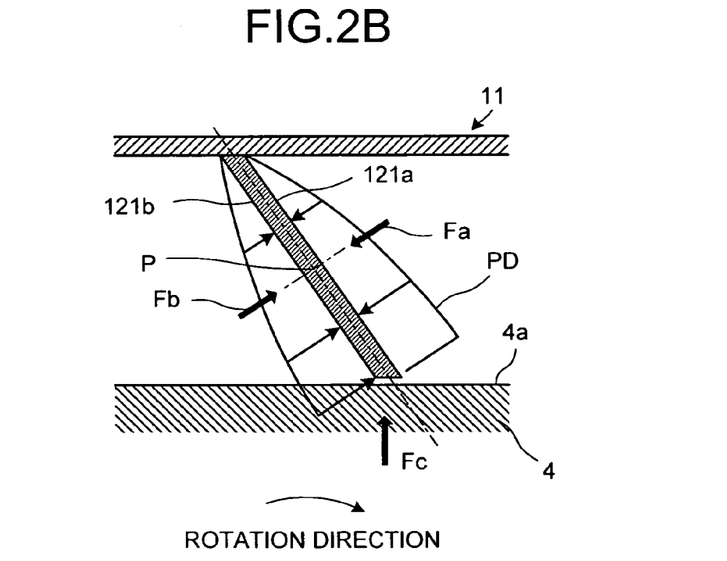

As shown in FIG. 2B, gas pressure applied on a lower face 121b of the thin plate becomes higher than gas pressure applied on an upper face 121a thereof according to formation of such a pressure distribution in a sectional view orthogonal to the rotor axial line in a widthwise direction of the thin plate 121. That is, as shown in FIG. 2B, the gas pressure distributions applied on the upper face 121a and the lower face 121b of the thin plate takes a triangular distribution shape showing a pressure distribution that is small at the outer peripheral proximal end 122, and is the largest at the inner peripheral free end 123. As a result, when gas pressures that are respectively applied on the upper face 121a and the lower face 121b at any point P in a lengthwise direction of the thin plate 121 are represented as Fa and Fb, and a pressure that floats a distal end of the inner peripheral free end 123 due to dynamic pressure of working fluid flowing between the rotor outer peripheral face 4a and the inner peripheral free end 123 of the thin plate 121 is represented as Fc, a relationship of Fb+Fc>Fa is satisfied.

When Fx=Fb+Fc−Fa is assumed, a criterion on whether a floating force acts on the thin plate 121 or a pressing force acts thereon can be set according to Fx>0 or Fx<0. That is, when Fx>0 is satisfied, a floating force acts on the thin plate, while a pressing force acts on the thin plate when Fe<0 is satisfied. When Fx=0 is satisfied, neither a floating force nor a pressing force acts on the thin plate. In Case 1, a floating force acts on the thin plate 121 and the thin plate floats because of Fx>0, as described above, so that the inner peripheral free end 123 and the rotor outer peripheral face 4a are kept in a non-contacting state therebetween.

Figure 3A:
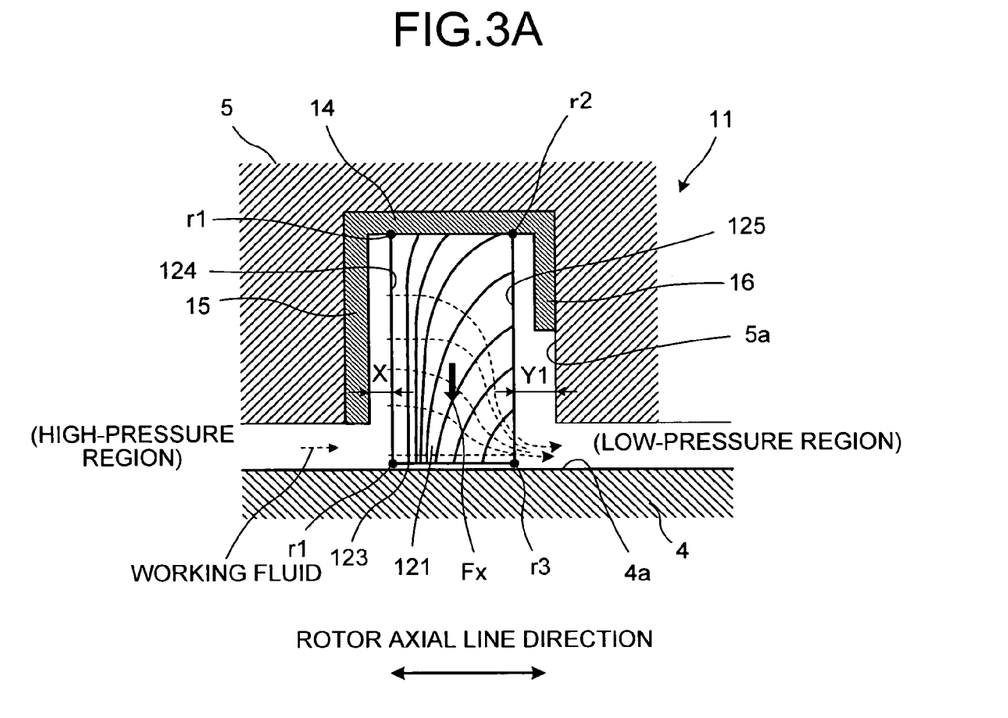
FIGS. 3A and 3B are schematics for illustrating a principle of an operation around a divided portion of a divided-type leaf seal.

In Case 2, a pressure distribution of working fluid is disturbed due to flowing of working fluid from a section of the divided portion into the leaf seal, as explained with reference to FIG. 10, concerning the problems of the conventional technique. This state will be explained with reference to FIGS. 3A and 3B. As shown in FIG. 3A, first, working fluid that has flowed inside the leaf seal 11 flows from the divided portion into the gap (the high-pressure gap X) between the high-pressure-side plate 15 and the thin plate edge 124 to enter along the high-pressure-side plate 15 in a circumferential direction. The working fluid that has entered to the inside forms a flow parallel to the rotor axial line along the upper and lower faces of the thin plate 121 over an entire length of the thin plate 121, from the outer peripheral proximal end 122 of the thin plate edge 124 to the inner peripheral free end 123, to flow into fine gaps in the thin plate group 12 obtained by stacking the thin plates. In the conventional leaf seal explained with reference to FIG. 2A, working fluid flows in from the lower end of the high-pressure-side plate 15 to flow on the upper and lower faces of each thin plate while diffusing from the inner peripheral free end 123 to the outer peripheral proximal end. Therefore, a substantially triangular gas pressure distribution where gas pressure is the highest at the corner r1 and gradually lowers toward the diagonal corner r2 is formed, so that an upward floating force is generated. However, in Case 2 concerning a portion around the divided portion of the divided-type leaf seal, a gas pressure distribution similar to the above cannot be obtained.

That is, as shown in FIG. 3A, working fluid, forming a flow parallel to the rotor axial line along upper and lower faces of the thin plate 121 to flow into fine gaps in the thin plate group 12 obtained by stacking the thin plates, flows downward as a flow parallel to the rotor axial line along the upper and lower faces of the thin plate 121. However, when spacing on an outlet side of working fluid, namely, a spacing of the low-pressure gap adjacent to the low-pressure region is not sufficient, working fluid forms downward flow inside the thin plates due to an outlet side resistance, to flow out to the low-pressure region. That is, working fluid necessarily flows from the lower end of the high-pressure-side plate 15 to inside of the leaf seal 11 at a seal portion where no divided portion is provided in the circumferential direction. Therefore, if the gap (the low-pressure gap Y1) defined between the stator inner wall 5a and the thin plate edge 125 is secured, upward flow of working fluid is necessarily generated inside the respective thin plates, so that floating force is necessarily generated.

Figure 3B:
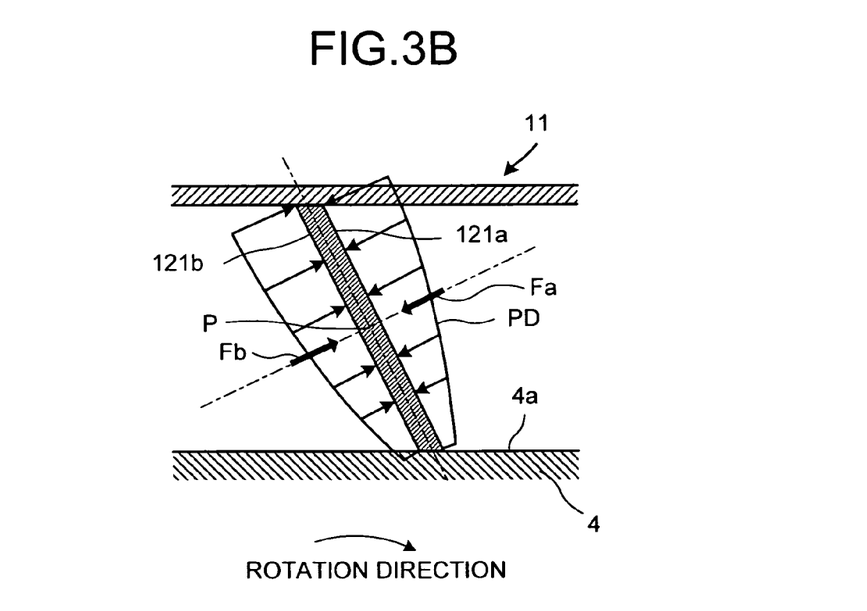

In the case of the divided-type leaf seal and around the divided portion, however, leakage of working fluid from a section of the divided portion cannot be suppressed. Therefore, upward flow of working fluid can not be generated or rather downward flow thereof is generated inside the thin plates. As a result, pressure becomes the highest at both the corner (r1) positioned at the outer peripheral proximal end 122 and the corner (r1) positioned at the inner peripheral free end 123 on the thin plate edge 124 adjacent to the high-pressure region. Although working fluid flows downward inside the thin plates and pressure lowers, downward flow is generated inside the thin plates. Therefore, when a gas pressure at the corner (r2) positioned on the outer peripheral proximal end 122 at the thin plate edge 125 facing the low-pressure region of the thin plate is compared with a gas pressure at the corner (r3) positioned at the inner peripheral free end 123 at the thin plate edge 125 facing the low-pressure region nearest to the outlet side, relationship of r1>r2>r3 can be obtained. Accordingly, as shown in FIG. 3B, a gas pressure distribution on the upper and lower faces of the thin plate 121 shows a substantially inverted triangular pressure distribution where pressure becomes the maximum at the outer peripheral proximal end 122 and becomes the minimum at the inner peripheral free end 123.

When working fluid shows such an inverted triangular pressure distribution, when gas pressures acting on the upper face 121a and the lower face 121b of the thin plate are represented as Fa and Fb, Fa<Fb is obtained. That is, assuming the relationship of Fx=Fa−Fb, Fx<0 is obtained so that a downward pressing force acts on the thin plate 121. In Case 1, since upward gas flow is generated on each thin plate 121, an upward force Fc acts on a distal end of the inner peripheral free end 123 due to gas pressure of combustion gas flowing between the rotor outer-surface 4a and the inner peripheral free end 123 of the thin plate 121. In the present Case, however, the downward pressing force Fx acts on each thin plate 121, as described above. Therefore, the distal end of the inner peripheral free end 123 comes in contact with the rotor outer-surface 4a, so that dynamic effect owing to working fluid between the rotor outer-surface 4a and the inner peripheral free end 123 cannot be expected. That is, in Case 2, since gas pressure acting on each thin plate 121 is generated by only Fa and Fb, assuming Fx=Fa−Fb, Fx<0 can be obtained. That is, a floating force is not generated on each thin plate 121, but a downward pressing force is generated thereon, so that the inner peripheral free end 123 of each thin plate is pressed on the rotor outer-surface 4a.

Figure 4A:
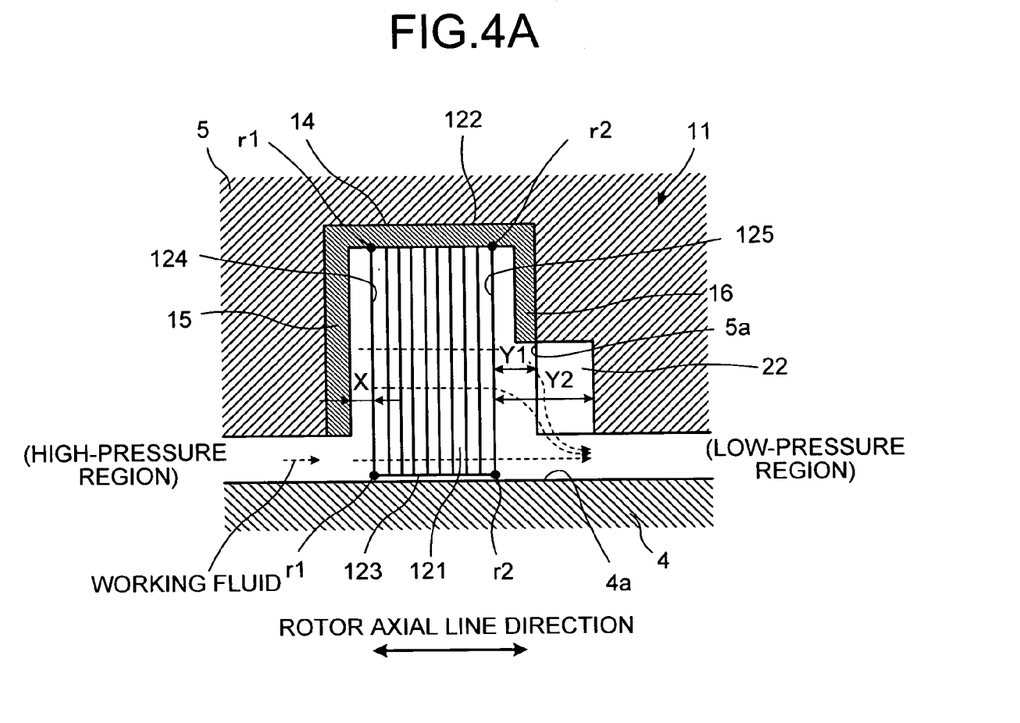
FIGS. 4A and 4B are schematics for illustrating a principle of an operation around a divided portion of a divided-type leaf seal according to the present invention.

In Case 3, in order to solve the problems arising around the divided portion of the conventional leaf seal, the low-pressure gap in the low-pressure region around the divided portion is further enlarged to reduce the pressing force. Specifically, as shown in FIG. 4A, the annular recess 22 is provided on a face of the stator 5 opposed to the low-pressure-side plate 16, and the low-pressure gap (Y1) is expanded. As shown in FIG. 4A, when the low-pressure gap after expansion is represented as Y2, and when the low-pressure gap in the conventional leaf seal, in other words, between the stator inner wall 5a in the other seal portion in the circumferential direction, except for around the divided portion of the leaf seal, and the thin plate edge 125 is represented as Y1, the annular recess 22 is provided on the stator inner wall 5 to satisfy Y2>Y1>X. In FIG. 4A, the mounting piece is not assembled. However, when the mounting piece 21 is assembled, a substantially same concept can be applied by regarding the stator 5 and the stator inner wall 5a as the mounting piece 21 and the mounting piece inner wall 21a respectively.

Figure 4B:
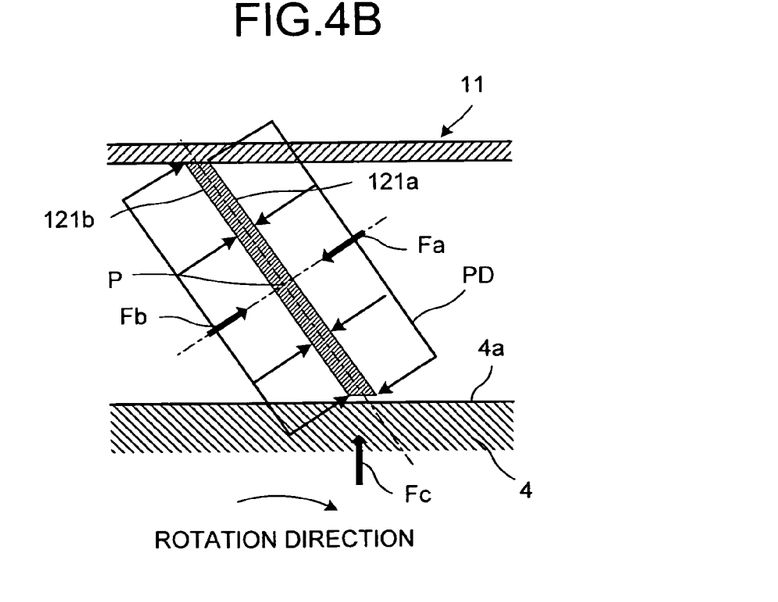

At a portion around the divided portion of the leaf seal, by adopting the low-pressure gap (Y2) larger than the low-pressure gap (Y1) in the circumferential direction except for around the divided portion in this manner, working fluid flowing in from a section of the divided portion via the high-pressure gap (X) forms a flow approximately parallel to the rotor axial line, to flow downward on each thin plate in the low-pressure region. Therefore, downward flow is hardly generated inside the thin plates. That is, as shown in FIG. 4A, a flow line of working fluid becomes parallel to the rotor axial line. As shown in FIG. 4B, a gas pressure distribution on the upper and lower faces of each thin plate in this Case shows a substantially rectangular pressure distribution in sectional view orthogonal to the rotor axial line. That is, the fact that the flow line of working fluid forms the parallel flow means that pressure lowering of working fluid, from the thin plate edge 124 facing the high-pressure-side plate 15, becomes approximately equal at any point in any sectional view perpendicular to the rotor axial line of each thin plate. Therefore it can be said that a substantially constant pressure distribution is obtained from the outer peripheral proximal end 122 of the thin plate to the inner peripheral free end 123.

That is, around the divided portion of the leaf seal, when the low-pressure gap is set so that a flow line of working fluid on the upper and lower faces of the thin plate forms a parallel flow to the rotor axial line, and gas pressures acting on the upper face 121a and the lower face 121b of the thin plate are represented as Fa and Fb, both Fa and Fb are approximately equal pressures in a range from the outer peripheral proximal end 122 to the inner peripheral free end 123, thereby establishing a relationship of Fa=Fb. That is, neither floating force nor pressing force is generated on the thin plate 121. On the other hand, since dynamic pressure of working fluid following rotation acts on the lower end of the inner peripheral free end 123 upwardly, along with increase in the number of revolutions of the rotor 4, the thin plate 121 receives the floating force to be floated slightly. Therefore, neither a contact resistance between the rotor outer peripheral face 4a and the inner peripheral free end 123 nor a frictional resistance is generated.

A concept of an action and a function of the sealing mechanism in the seal portion except for around the divided portion can be considered the same as Case 1.

In order to exhibit the effect securely around the divided portion of the leaf seal, it is desirable that a width of the low-pressure gap (Y2) around the divided portion is at least 1.5 times a width of the low-pressure gap (Y1) in the circumferential direction except for around the divided portion. When a low-pressure gap of five times or more is provided, a leakage amount of working fluid from the low-pressure gap increases, which is undesirable regarding running cost. The present embodiment relates to the divided-type leaf seal, where the divided face can be provided in a plane including the rotor axial line or the divided face can have an inclination angle to the plane. The divided face is not necessarily flat, but may be curved.

Figure 5:
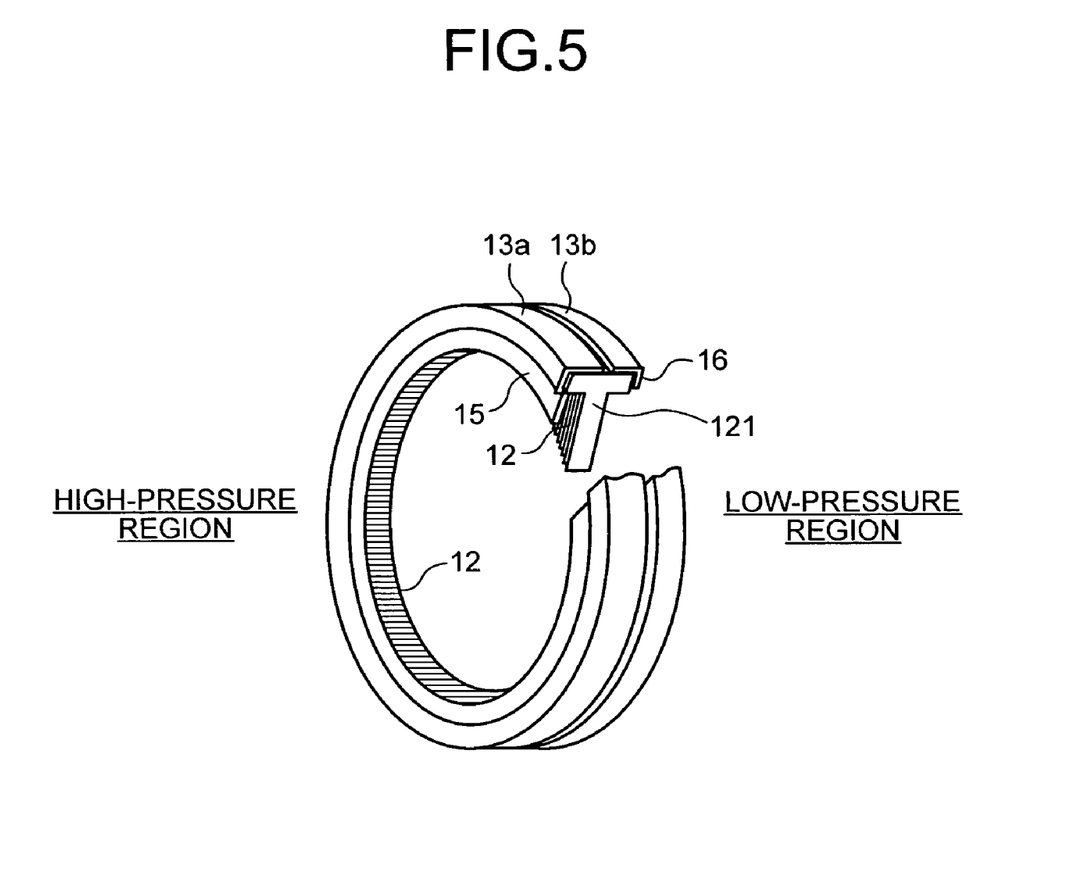
FIG. 5 is a perspective view of an integral leaf seal according to the present invention.
Figure 6:
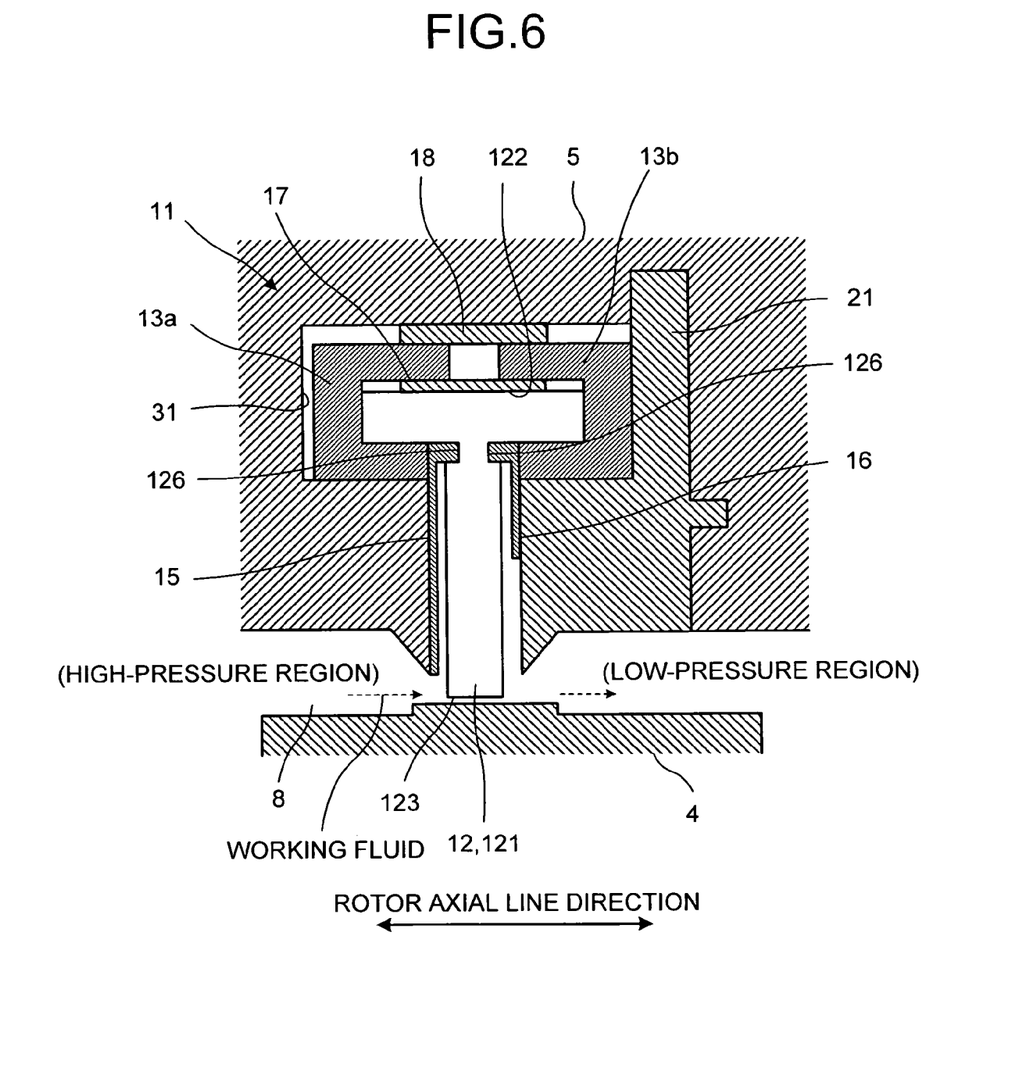
FIG. 6 is a cross section of a structure for mounting the integral leaf seal according to the present invention on a stator.

A second embodiment of the present invention will be explained with reference to FIGS. 5 and 6. FIG. 5 is a perspective view of a shaft sealing mechanism including an integral leaf seal and not including any divided portions. In FIG. 5, a divided section is shown in order to show an internal structure, but an actual leaf seal is formed integrally, to have no divided portion. FIG. 6 depicts a structure for mounting the shaft sealing mechanism, including the integral leaf seal, on a stator. The second embodiment is different from the first embodiment in that the shaft sealing mechanism 11 does not have any divided portions and is formed integrally, but other constitutions are the same for the both embodiments. Regarding the structure for mounting the shaft sealing mechanism on the stator, the second embodiment is different from the first embodiment in that the annular recess 22 is not provided on the mounting piece 21, but other constitutions are the same for the both embodiments. Accordingly, explanation of a detailed constitution of this embodiment is omitted.

In the shaft sealing mechanism including such integral leaf seal, since there is no divided portion, leakage of working fluid from a section of the divided portion does not occur, a gas pressure distribution acting on each thin plate is stable, and an upward floating force always acts over the entire circumference of the shaft sealing mechanism. Therefore, since neither a contact resistance between the inner peripheral free end of the thin plate and the rotor outer peripheral face nor a frictional resistance is generated, the seal is prevented from wearing. Since mounting of the shaft sealing mechanism on the stator is completed by providing the recessed groove on the stator, fittingly inserting the shaft sealing mechanism into the recessed groove, and thereafter fitting the mounting piece in the remaining gap, assembling is facilitated.

Figure 7A:
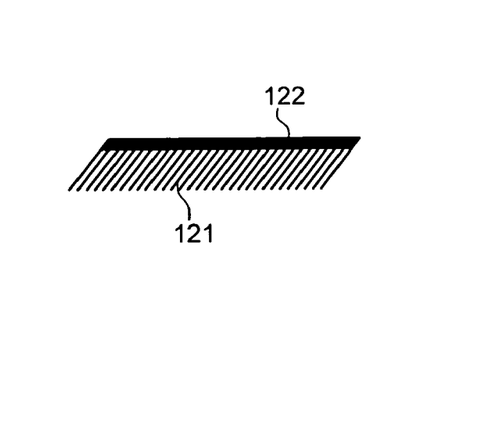
FIGS. 7A to 7C are schematics for illustrating a manufacturing method of the leaf seal according to the present invention.
Figure 7B:
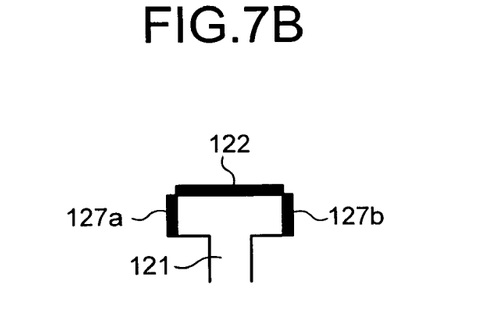
Figure 7C:
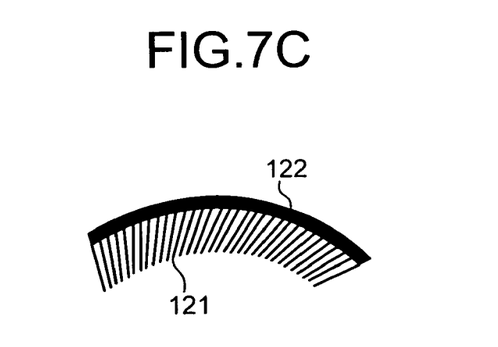

A manufacturing method of the shaft sealing mechanism including a leaf seal will be explained next. The method is only one example and the present invention is not limited to this example. As shown in FIG. 7A, respective thin plates, produced by punching steel plates in a T-shape, are superimposed obliquely in a multi-layered manner, and outer peripheral proximal ends 122 thereof are joined together by welding. Specifically, as shown in FIG. 7B, outer peripheral proximal ends 122, and side ends 127a and 127b positioned on wider portions of the respective thin plates 121 are welded, and the joined thin plates are bent such that they can be easily inserted in the thin-plate holding ring. Next, as shown in FIG. 1, heads of the high-pressure-side plate 15 and the low-pressure-side plate 16 are inserted into a pair of receiving grooves 126 provided on both side edges of the respective thin plates, the thin plate group 12 is sandwiched by a pair of thin-plate holding rings 13a and 13b via a spacer 17, and the thin-plate holding rings 13a and 13b are welded to the spacer 17, so that the shaft sealing mechanism is completed. According to this method, since the high-pressure-side plate and the low-pressure-side plate are mounted precisely, adjustment of the high-pressure gap and the low-pressure gap is easy.

According to the present invention, at a portion around the divided portion of the shaft sealing mechanism having at least one divided portion, even when gas pressure distributions on the upper and lower faces of the thin plate is disturbed due to leakage of high pressure working fluid from a section of the divided portion, since the low-pressure gap at least around the divided portion of the shaft sealing mechanism is set to be larger than the remaining low-pressure gap in the circumferential direction except for the portion around the divided portion, a gas pressure distribution is improved around the divided portion. Therefore, there is no pressing force acting on the thin plate around the divided portion, and the thin plate is floated from the rotor outer-surface. Thus, the seal wearing and heat generation due to contact between the thin plate and the rotor outer-surface are prevented.

Furthermore, according to the present invention, at a portion around the divided portion of the shaft sealing mechanism having at least one divided portion, even when gas pressure distributions on the upper and lower faces of the thin plate is disturbed due to leakage of high pressure working fluid from a section of the divided portion, since the low-pressure gap at least around the divided portion of the shaft sealing mechanism is set to be larger than the low-pressure gap formed between the stator inner wall or the mounting piece inner wall and the thin plate edge opposed thereto, a gas pressure distribution is prevented from being disturbed even around the divided portion. Therefore, there is no pressing force acting on the thin plate group over a front periphery of the shaft sealing mechanism including the portion around the divided portion, so that the seal wearing can be prevented.

Moreover, according to the present invention, at a portion around the divided portion of the shaft sealing mechanism having at least one divided portion, even when gas pressure distributions on the upper and lower faces of the thin plate is disturbed due to leakage of high pressure working fluid from a section of the divided portion, since the low-pressure gap is set such that a pressing force does not act on the thin plate owing to a gas pressure distribution of the working fluid flowing downward on a surface of the thin plate around the divided portion of the shaft sealing mechanism, an upward floating force acts on the inner peripheral free end of the thin plate. That is, the low-pressure gap around the divided portion of the shaft sealing mechanism is set to be larger than the remaining low-pressure gap except for at least the portion around the divided portion. Therefore, a flowing line of working fluid flowing downward on the thin plate becomes parallel to the rotor axial line, so that a pressing force acting on the thin plate is not generated from the working fluid. Therefore, the thin plate is floated from the rotor outer-surface owing to a dynamic pressure effect at the inner peripheral free end of the thin plate, so that the seal wearing and heat generation due to contact between the seal and the rotor outer-surface are prevented.

Furthermore, according to the present invention, even when the shaft sealing mechanism has at least one divided portion, the low-pressure gap is further enlarged by providing the annular recess in the mounting piece so that a gas pressure distribution acting on the thin plate is improved. Therefore, there is no pressing force acting on the thin plate from working fluid, and a contact resistance generated between the inner peripheral free end of each thin plate and the rotor outer peripheral face is reduced, so that the seal wearing can be prevented. Heat generation due to the contact between the thin plate and the rotor, and generation of vibrations are prevented. After the shaft sealing mechanism is inserted in the recessed groove of the stator, the mounting piece is fittingly inserted into the gap of the stator to be fixed. Thus, the shaft sealing mechanism can be mounted easily.

Moreover, according to the present invention, the low-pressure gap can be set more efficiently by providing the recess extending from a height equal to the lower end of the low-pressure-side plate to the lower end of the mounting piece. Therefore, a stable pressure distribution can be obtained over the entire periphery of the shaft sealing mechanism. Since a range in which the low-pressure gap can be provided is limited, loss due to leakage of working fluid can be reduced.

Furthermore, according to the present invention, since the shaft sealing mechanism does not have any divided portion and is formed in an integral seal, high pressure wording fluid does not leak into the shaft sealing mechanism from a section of the divided portion. Therefore, pressure distributions of working fluid formed on the upper and the lower faces of each thin plate are stabilized over the entire periphery of the shaft sealing mechanism so that floating force always acts on the thin plate. Accordingly, a contact resistance between the rotor outer peripheral face and the inner peripheral free end of the thin plate is not generated so that the seal wearing is prevented.

Moreover, according to the present invention, the integral seal is adopted as the shaft sealing mechanism, and high pressure wording fluid does not leak into the shaft sealing mechanism from a section of the divided portion. Therefore, stable pressure distributions are obtained on the upper and lower faces of each thin plate over the entire periphery of the shaft sealing mechanism. Accordingly, a contact resistance between the rotor outer peripheral face and the inner peripheral free end of the thin plate is not generated. Since the mounting piece is fittingly inserted into the gap of the stator to be fixed to the stator, after the shaft sealing mechanism is inserted into the recessed groove of the stator, the shaft sealing mechanism can be mounted easily.

Furthermore, according to the present invention, since leakage of working fluid from the high-pressure region to the low-pressure region is reduced, the turbine can be stably operated for a long period, and running cost of the turbine can be reduced.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A shaft sealing mechanism having an annular shape and being installed in an annular space between a rotor and a stator, the shaft sealing mechanism comprising:
   a plurality of stacked thin plates, each of the thin plates having an outer peripheral fixed end and an inner peripheral free end, wherein the inner peripheral free ends of the thin plates come into sliding contact with the rotor such that a surface of the rotor and the thin plates form an acute angle so as to partition the annular space into a high-pressure region and a low-pressure region;
   at least one divided portion circumferentially dividing portions of the shaft sealing mechanism along the plurality of thin plates;
   a first low-pressure gap in the low-pressure region, the first low-pressure gap extending in an axial direction of the rotor and in the circumferential direction of the rotor near the at least one divided portion; and
   a second low-pressure gap in the low-pressure region, the second low-pressure gap extending in the axial direction of the rotor and in the circumferential direction of the rotor at a position other than that of the first low-pressure gap, wherein the first low-pressure gap is larger than the second low-pressure gap into axial direction of the rotor.

2. A shaft sealing mechanism having an annular shape and being installed in an annular space between a rotor and a stator, the shaft sealing mechanism comprising:
   a plurality of stacked thin plates, each of the thin plates having an outer peripheral fixed end and an inner peripheral free end, wherein the inner peripheral free ends of the thin plates come into sliding contact with the rotor such that a surface of the rotor and the thin plates form an acute angle so as to partition the annular space into a high-pressure region and a low-pressure region;
   at least one divided portion circumferentially dividing portions of the shaft sealing mechanism along the plurality of thin plates;
   a first low-pressure gap in the low-pressure region, the first low-pressure gap extending in an axial direction of the rotor and in the circumferential direction of the rotor near the at least one divided portion; and
   a second low-pressure gap in the low-pressure region, the second low-pressure gap extending in the axial direction of the rotor between (a) an inner wall of the stator or an inner wall of a mounting piece and (b) an edge of the thin plates facing the low-pressure region, wherein the first low-pressure gap is larger than the second low-pressure gap in the axial direction of the rotor.

3. A shaft sealing mechanism having an annular shape and being installed in an annular space between a rotor and a stator, the shaft sealing mechanism comprising:
   a plurality of stacked thin plates, each of the thin plates having an outer peripheral fixed end and an inner peripheral free end, wherein the inner peripheral free ends of the thin plates come into sliding contact with the rotor such that a surface of the rotor and the thin plates form an acute angle so as to partition the annular space into a high-pressure region and a low-pressure region;

at least one divided portion circumferentially dividing portions of the shaft sealing mechanism along the plurality of thin plates; and at least one low-pressure gap in the low-pressure region, the at least one low-pressure gap extending in an axial direction of the rotor and in the circumferential direction of the rotor near the at least one divided portion so as to prevent a pressing force of a working fluid flowing downward on surfaces of the thin plates from acting on the thin plates.

4. A structure for mounting a shaft sealing mechanism having an annular shape on a stator, the shaft sealing mechanism being installed in an annular space between a rotor and the stator, wherein the shaft sealing mechanism includes a plurality of stacked thin plates, each of the thin plates having an outer peripheral fixed end and an inner peripheral free end, wherein the inner peripheral free ends of the thin plates come into sliding contact with the rotor such that a surface of the rotor and the thin plates form an acute angle so as to partition the annular space into a high-pressure region and a low-pressure region, at least one divided portion circumferentially dividing portions of the shaft sealing mechanism along the plurality of thin plates, and a low-pressure side plate extending along the plurality of thin plates in the low-pressure region, and wherein the structure includes a recessed groove formed on the stator and shaped to accommodate the shaft sealing mechanism, a mounting piece fittingly inserted in the recessed groove with the shaft sealing mechanism, and an annular recess provided on a surface of the mounting piece opposed to the low-pressure-side plate.

5. The structure according to claim 4, wherein the annular recess extends from a lower end of the low-pressure-side plate to a lower end of the mounting piece.

6. A turbine comprising:

a rotor;

a stator; and a shaft sealing mechanism installed in an annular space between the rotor and the stator, the shaft sealing mechanism having an annular shape, and wherein the shaft sealing mechanism includes a plurality of stacked thin plates, each of the thin plates having an outer peripheral fixed end and an inner peripheral free end, wherein the inner peripheral free ends of the thin plates come into sliding contact with the rotor such that a surface of the rotor and the thin plates form an acute angle so as to partition the annular space into a high-pressure region and a low-pressure region, at least one divided portion circumferentially dividing portions of the shaft sealing mechanism along the plurality of thin plates, a first low-pressure gap in the low-pressure region, the first low-pressure gap extending in an axial direction of the rotor and in the circumferential direction of the rotor near the at least one divided portion, and a second low-pressure gap in the low-pressure region, the second low-pressure gap extending in the axial direction of the rotor and in the circumferential direction of the rotor at a position other than that of the first low-pressure gap, wherein the first low-pressure gap is larger than the second low-pressure gap in the axial direction of the rotor.

7. A turbine comprising:

a rotor;

a stator; and a shaft sealing mechanism installed in an annular spate between the rotor and the stator, the shaft sealing mechanism having an annular shape, and wherein the shaft sealing mechanism includes a plurality of stacked thin plates, each of the thin plates having an outer peripheral fixed end and an inner peripheral free end, wherein the inner peripheral free ends of the thin plates come into sliding contact with the rotor such that a surface of the rotor and the thin plates form an acute angle so as to partition the annular space into a high-pressure region and a low-pressure region, at least one divided portion circumferentially dividing portions of the shaft sealing mechanism along the plurality of thin plates, a first low-pressure gap in the low-pressure region, the first low-pressure gap extending in an axial direction of the rotor and in the circumferential direction of the rotor near the at least one divided portion, and a second low-pressure gap in the low-pressure region, the second low-pressure gap extending in the axial direction of the rotor between (a) an inner wall of the stator or an inner wall of a mounting piece and (b) an edge of the thin plates facing the low-pressure region, wherein the first low-pressure gap is larger than the second low-pressure gap in the axial direction of the rotor.

8. A turbine comprising:

a rotor;

a stator; and a shaft sealing mechanism installed in an annular space between the rotor and the stator, the shalt sealing mechanism having an annular shape, and wherein the shaft sealing mechanism includes a plurality of stacked thin plates, each of the thin plates having an outer peripheral fixed end and an inner peripheral free end, wherein the inner peripheral free ends of the thin plates come into sliding contact with the rotor such that a surface of the rotor and the thin plates form an acute angle so as to partition the annular space into a high-pressure region and a low-pressure region, at least one divided portion circumferentially dividing portions of the shaft sealing mechanism along the plurality of thin plates, and at least one low-pressure gap in the low-pressure region, the at least one low-pressure gap extending in an axial direction of the rotor and in the circumferential direction of the rotor near the at least one divided portion so as to prevent a pressing force of a working fluid flowing downward on surfaces of the thin plates from acting on the thin plates.

9. A turbine comprising:

a rotor;

a stator;

a shaft sealing mechanism installed in an annular space between the rotor and the stator, the shaft sealing mechanism having an angular shape, and wherein the shaft sealing mechanism includes a plurality of stacked thin plates, each of the thin plates having an outer peripheral fixed end and an inner peripheral free end, wherein the inner peripheral free ends of the thin plates come into sliding contact with the rotor such that a surface of the rotor and the thin plates form an acute angle so as to partition the annular space into a high-pressure region and a low-pressure region, and at least one divided portion circumferentially dividing portions of the shaft sealing mechanism along the plurality of thin plates; and a structure for mounting the shaft sealing mechanism on the stator, wherein the structure includes a recessed groove formed on the stator and shaped to accommodate the shaft sealing mechanism, a mounting piece fittingly inserted in the recessed groove with the shaft sealing mechanism, and an annular recess provided on a surface of the mounting piece opposed to the low-pressure-side plate.

* * * * *